Figure 1:
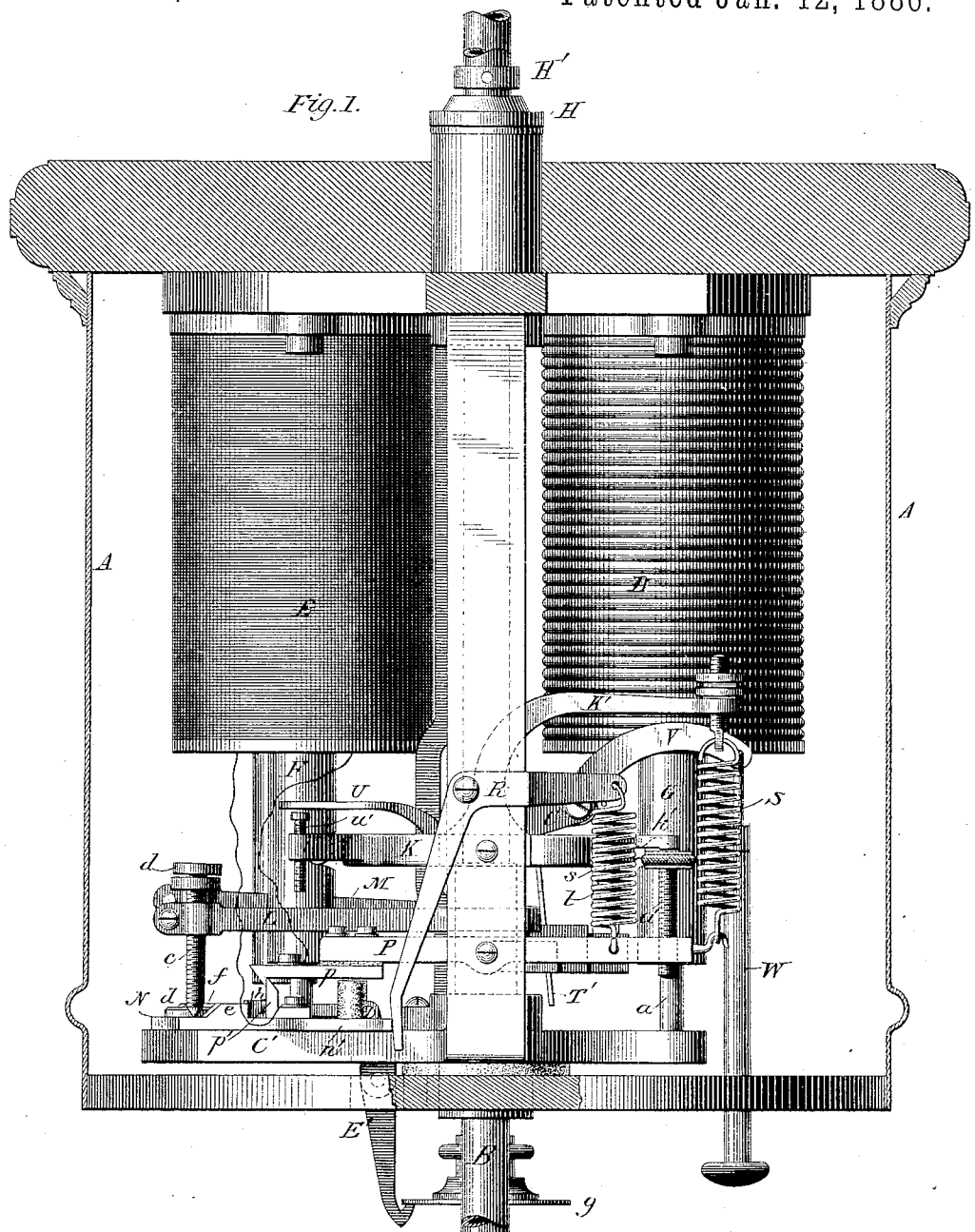

(No Model.)

5 Sheets—Sheet 1.

E. WESTON.
ELECTRIC ARC LAMP.

No. 334,144. Patented Jan. 12, 1886.

Attest:
Raymond F. Barnes
W. Frisby

Inventor:
Edward Weston
By Parker W. Page
atty.

(No Model.)  5 Sheets—Sheet 3.
E. WESTON.
ELECTRIC ARC LAMP.

No. 334,144. Patented Jan. 12, 1886.

Attest:
Raymond F. Barnes
Jas. Daniel Compton

Inventor:
Edward Weston
By Parker W. Page
Atty.

(No Model.)  5 Sheets—Sheet 4.

E. WESTON.
ELECTRIC ARC LAMP.

No. 334,144. Patented Jan. 12, 1886.

Attest:
Raymond F. Bamsq.
Jas. Daniel Compton.

Inventor:
Edward Weston
By Parker W. Page
atty.

(No Model.) 5 Sheets—Sheet 5.

E. WESTON.
ELECTRIC ARC LAMP.

No. 334,144. Patented Jan. 12, 1886.

Attest. Inventor:

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

ELECTRIC-ARC LAMP.

SPECIFICATION forming part of Letters Patent No. 334,144, dated January 12, 1886.

Application filed February 12, 1885. Serial No. 155,665. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Electric-Arc Lamps, of which the following is a specification, reference being had to the drawings accompanying and forming a part of the same.

My invention is an improvement in electric-arc lamps, the same being more particularly applicable to double lamps or those having two sets of carbons; and it consists in a novel construction and combination of the devices for effecting the transfer of current from one set of carbons to the other, or from the carbons to a path or circuit around the lamp.

In former patents granted to me I have shown a mechanism for shifting the current from one to another set of carbons, in which are used with the clutches that control the feed or descent of the carbon-holder a shifting or movable floor and an electro-magnet in a normally-open derived or shunt circuit for controlling the movement or position of the floor. The circuit containing this magnet is closed by a stop on one of the carbon-holders coming into contact with a fixed stop, and the magnet, when energized, causes the floor to shift with respect to the clutches, so that a step or projection on said floor is drawn from under the end of the clutch of the unconsumed carbons, and another step or raised portion brought under the clutch of the carbons that have burned down.

By my present invention I dispense with the magnet above described, utilizing for the same purpose a supplemental coil on the core of the shunt-feeding magnet, including said coil in a shunt-circuit that is closed by the contact of the stop on the carbon-holder with a fixed stop. The accession of strength which the shunt-magnet acquires by the closing of this circuit raises one end of the lever to which the clamps or clutches are connected, and the depression of the other end is utilized for liberating a catch, which permits a spring-actuated floor or plate to shift its position relatively to the clutches, throwing thereby one clutch out of operation and bringing the other into operation. The circuit of the supplemental coil is made through the catch or any two parts of the shifting mechanism that separate, so that at the moment the catch is operated the said circuit is broken. I also combine with the lever controlled by the feed-magnets a cut-out operated or tripped by an arm that extends into the path of movement of the lever, but which is not encountered by the same until it has passed the position in which it operates the shifting device. The purpose of this is to shunt the lamp out of circuit when the second set of carbons has been consumed, or when, after the current has been shifted from the first to the second set, an abnormally long arc forms between the carbons of the second set.

Figure 2:
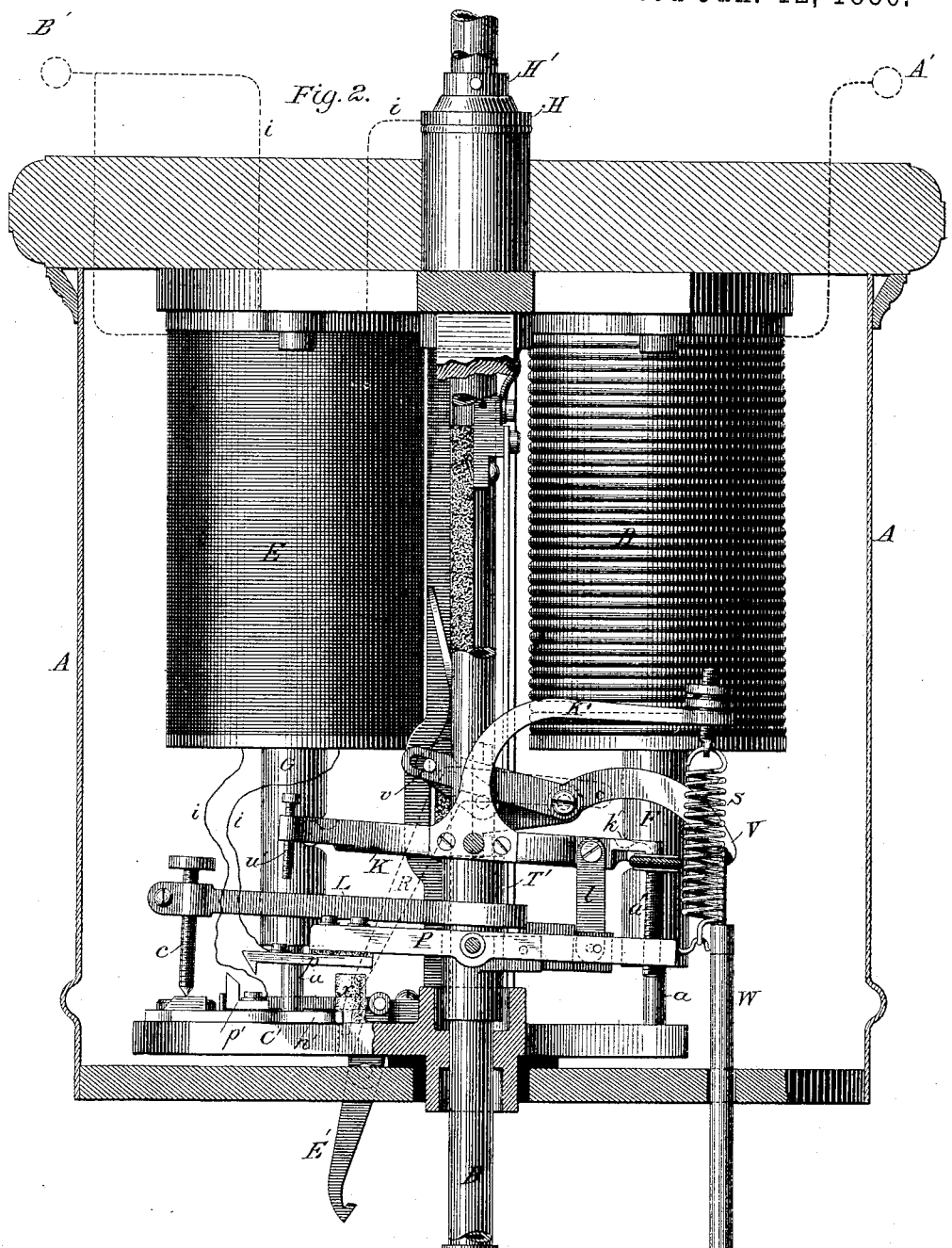
Figure 3:
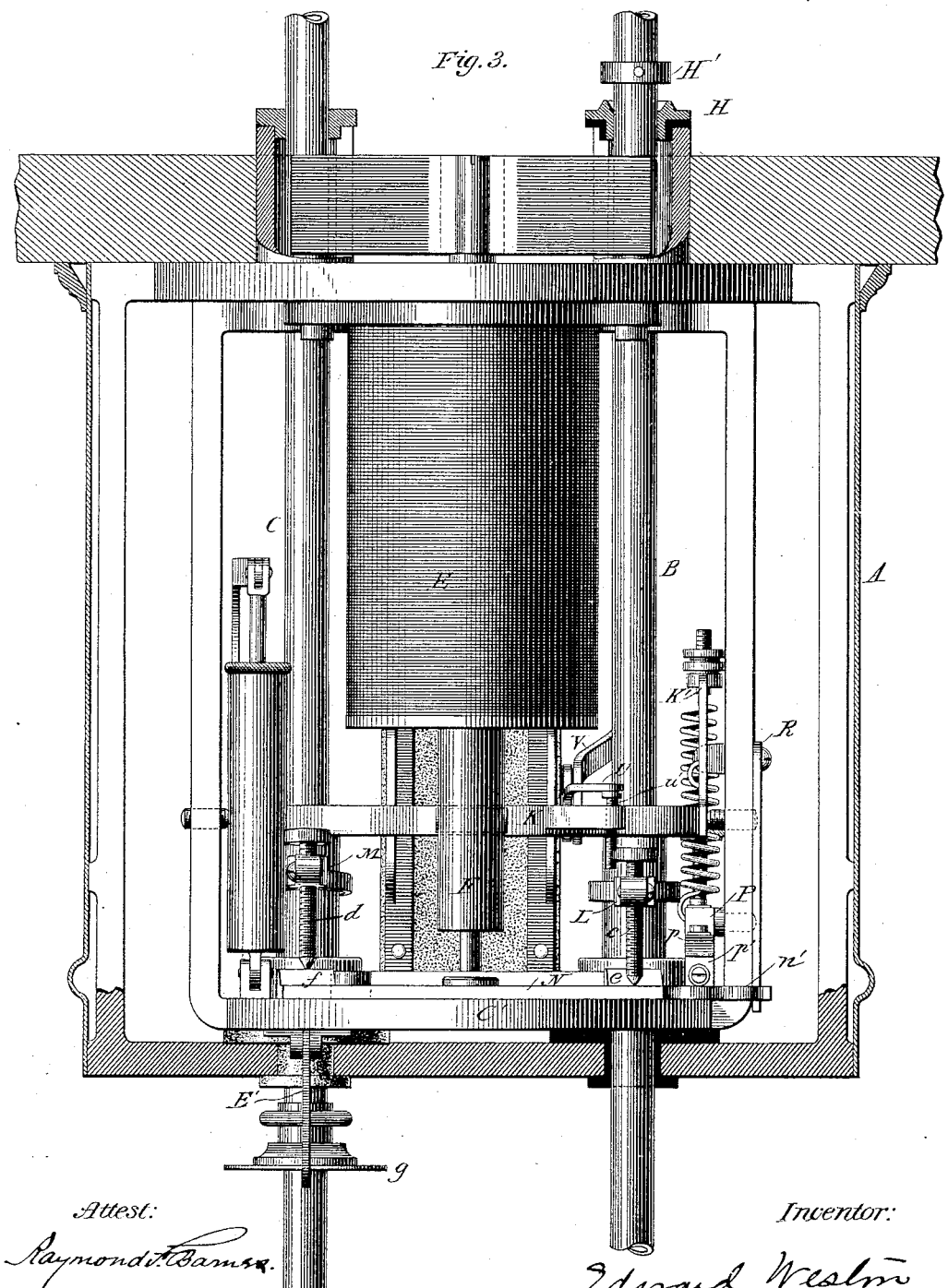
Figure 4:
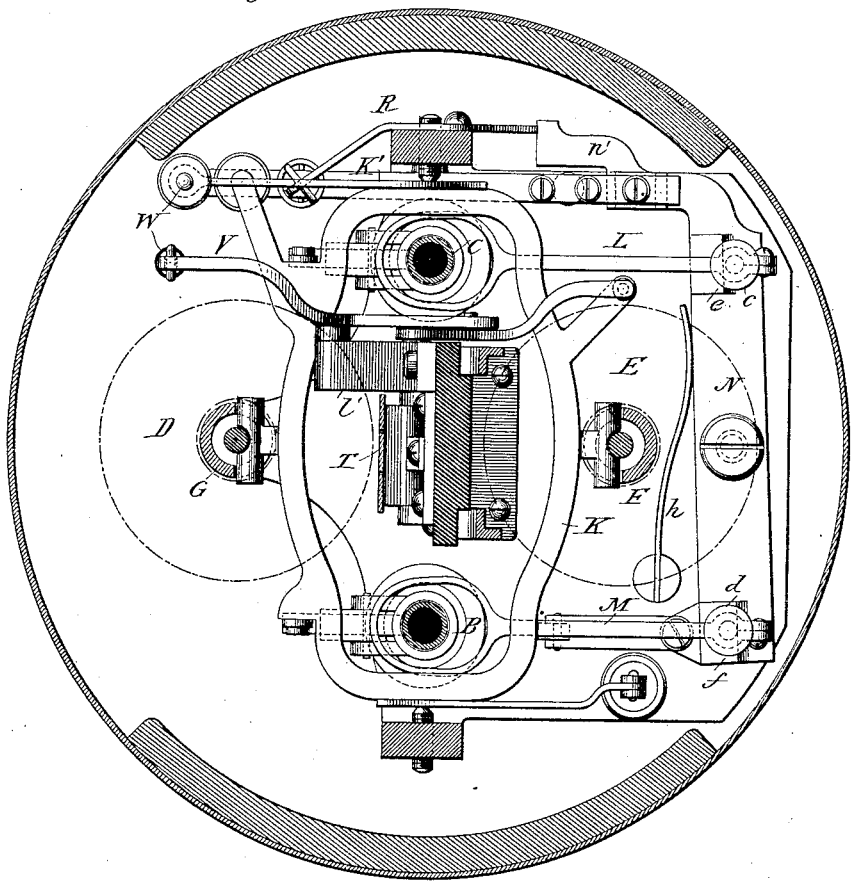
Figures 5, 6:
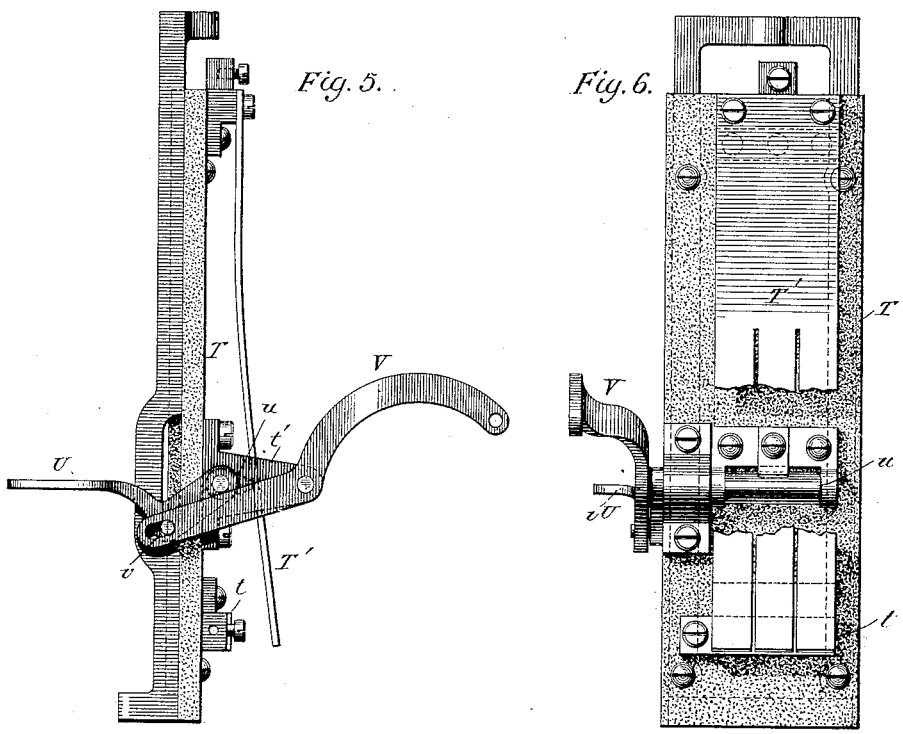

These improvements are illustrated in the accompanying drawings, in which Figure 1 is a side elevation of the working parts of a double lamp embodying my invention. Fig. 2 is a similar view with certain parts removed, and showing the shifting devices in another position. Fig. 3 is an elevation of the lamp turned at right angles to its position in Fig. 1. Fig. 4 is a plan view of the shifting and feed mechanism. Figs. 5 and 6 are side and plan views, respectively, of the cut-out mechanism detached from the other parts of the lamp.

A A is the box or inclosing-case of an electric-arc lamp; B C, the two carbon rods or holders; D E, the electro-magnets or helices; F G, the cores or armatures moving vertically within said helices. The functions of the magnets and the plan of connections, so far as the feed and adjustment of the carbons are concerned, differ in no respect from those of other lamps of this kind—that is to say, magnet or helix D is wound with coarse wire and helix E with very fine wire. The current enters the lamp by a binding-post, A', passes around magnet D, and thence goes to the carbon rod and upper carbon, to the lower carbon, and, by the usual conductors, to binding-post B'. The helix E is, however, compound—that is, it is composed of two independent helices moved one over the other in the same direction. One section or helix is included in a constantly-closed shunt around the carbons. The other is in a shunt that begins at a fixed insulated metal stop, H, and ends at binding-post B', but which includes also two separable parts of the shifting mechanism, as hereinafter described. The cores F G slide on guide-bars *a a*, passing centrally through them. A lever, K, pivoted to the frame of the lamp, is connected with the cores, and is tilted in one or the other direction by the preponderance of magnetic attraction exerted by the two helices. To this lever, on the side of the main magnets, two clutches or clamps, L M, are connected by links *l m*. Through the ends or "tails" of these clamps pass adjustable stops or screws *c d*, by the contact of which with the floor the liberation of the clutches is effected.

N is a bar pivoted to the plate C' at *d*, and having two steps or raised portions, *e f*, with beveled edges, which, by the shifting of the plate, are brought alternately under the stops *c d*.

E' is a pivoted catch connected with one end of plate N, and arranged in one position of the plate to engage with a suitable flange, *g*, on one of the carbon-holders. The plate N is actuated by a spring, *h*, attached to the base C', and is held in the position opposed by said spring by a lever, P, pivoted to the lamp-frame and carrying an insulated metal hook, *p*, that engages with a projection, *p'*, on the plate N.

The construction of the plate N and of the parts appertaining thereto and their mode of operation are well known and described more in detail in a patent granted to me October 17, 1882, No. 266,240.

R is an angle lever pivoted to the lamp-frame. One end is connected by a spiral spring, *s*, with the lever P. The other is in the path of a projection, *n'*, from lever N. The purpose of this lever will appear from a description of the operation of the shifting mechanism. From the frame or lever K extends an arm, K', connected with the end of lever P by a spiral spring, S, and a second arm, *k'*, beneath which is a screw, *a'*, set in the lever P. The operation of these parts is as follows: On starting the lamp the plate N is shifted so that the stop of clutch L rests upon the lower portion of the plate, and the hook or catch E' is set in engagement with flange *g*. Under these conditions, although both clutches are raised by the lifting-magnet D, the clutch L will bind and lift first because its stop *c* rests upon a lower floor than stop *d*. The arc will therefore form between the set of carbons of which B is the rod or holder, and the arc will continue to burn there until the said carbons are consumed. The rod B descends until a stop, H', on the rod comes into contact with the insulated stop H. This closes the circuit through the supplemental coil by diverting current from the rod B through the wire *i* and the supplemental coil of fine wire of helix E. This circuit is carried through the insulated metal catch *p* and stop *p'*. The additional current which is thus diverted through the coils of helix E increases the strength of the same to such an extent that the lever or frame K is tilted until the arm *k'* comes in contact with the head of screw *a'*, and causes a still further movement of the same that actuates the lever P and releases the catch *p*. The action of the springs *h s* at once throws the plate N into its other extreme position and raises the stop *d* of clutch M. By this means the second set of carbons is brought into operation. When the catch *p* is released, the circuit, through the supplemental coil of helix E, is interrupted, and its attractive force at once falls to normal. The metallic catch *p* falls into contact with an insulating-stop, *x*, and the operation of the lamp proceeds with the second set of carbons as with the first. When the arm *k* is depressed by the movement of lever K, and comes into contact with screw *a'*, a further downward movement would not be opposed by the spring S, as both levers P and K are moved downward. For this reason I use the lever R and spring *s*, which opposes the depression of lever P by lever K, a precaution which, it will be observed, prevents a too sensitive action of the shifting mechanism.

If, for any cause, an abnormally long arc should form between the carbons first to be consumed, the current will be shifted to the second set of carbons by the increased power of helix E. Should a long arc form between the carbons of the second set, however, it is necessary for the protection of the lamp to shift the current around it. This I do by an apparatus shown in Figs. 5 and 6. On an insulating-plate, T, is secured a flat spring, T', and near its end a contact, *t*. The spring and the contact *t* are connected by wires of low resistance to the opposite terminals of the lamp, so that when the spring rests upon the contact the entire current is shunted around the lamp. The plate T is secured in a vertical position between the helices, and a standard, *t'*, is secured to it under the spring T'. A bent arm or lever, U, turns on a pin set in the standard *t'* and a short rounded arm, *u*, that bears against the under side of spring T' and raises the same from contact *t* when the arm U is depressed, but which allows the spring to rest upon the contact when arm U is raised. The arm U extends over a screw, *u'*, in lever K on the side of helix E, and in such position that it will not be encountered by said screw or stop unless the strength of helix E be greater than the normal, and it is so constructed or adjusted that it will not permit the spring T' to touch the contact *t* until the lever K has been tilted beyond the position at which it liberates the catch *p*. For this purpose the lever U is made in such shape that when the long arm is depressed to its lowest limit, determined by any form of stop, the spring T' will bear directly upon the end of the rounded arm *u*. If the arm U be then slightly raised by the lever K, it will be shifted when a certain point is reached by the action of the spring T' alone.

A lever, V, pivoted to the standard *t'*, and connected to the long arm U by a pin, *v*, working in a slot, is used for resetting the spring T', a pin, W, depending from the free end of lever V and extending outside of the lamp-case being used for tilting the lever V.

What I claim is—

1. In an electric-arc lamp, the combination, with feed-controlling main and shunt circuit helices and magnets, a pivoted armature frame or lever, two sets of carbons, and clamps or clutches for controlling feed and adjustment, of a floor of varying height for tripping said clamps, and means for shifting the same operated or brought into operation by an abnormal strengthening of the shunt helix or magnet, and the movement of the armature-lever produced thereby, substantially as set forth.

2. In an electric-arc lamp, the combination, with feed-controlling main and shunt circuit helices or magnets, a pivoted armature frame or lever, two sets of carbons, and clamps or clutches for controlling their feed and adjustment, of a floor of varying height for tripping said clamps, springs for shifting the position of the floor, and a catch for retaining the same in position opposed by the springs, arranged to be released or tripped by the armature-lever when moved beyond its normal range of movement by an abnormal strengthening of the shunt helix or magnet, as set forth.

3. In an electric-arc lamp, the combination of a pivoted armature-lever, two sets of carbons, feed mechanism connected with the lever and controlling the carbons, a current-shifting mechanism operated by a given movement of the lever beyond the normal for bringing into action the two sets of carbons successively, a main-circuit magnet or helix, and a shunt-circuit magnet or helix for controlling the movement of the armature-lever, the shunt-circuit magnet or helix being formed with two coils, one in a constantly-closed shunt, the other in a shunt that is completed by the descending carbon-holder of the set of carbons first consumed, as herein set forth.

4. In an electric-arc lamp, the combination of a pivoted armature-lever, two sets of carbons, clamps or clutches connected with the lever and controlling the carbons, a spring-actuated shifting floor of varying height for tripping said clamps, a catch for retaining the floor in a position opposed by the spring, and arranged to be released by a given movement of the armature-lever beyond the normal, a main-circuit magnet or helix, and a shunt-circuit magnet or helix for controlling the movement of the lever, the shunt-circuit magnet or helix being formed with two coils, one in a constantly-closed shunt, the other in a shunt that is completed by the descending carbon-holder of the set of carbons first consumed, as herein set forth.

5. In an electric lamp, the combination of a pivoted lever, two sets of carbons, clamps or clutches connected with the lever and controlling the carbons, a current-shifting mechanism operated by a given movement of the lever for bringing into action the two sets of carbons successively, a main-circuit magnet or helix, and a shunt-circuit magnet or helix for controlling the movement of the lever, the shunt-circuit magnet or helix being formed with two coils, one in a constantly-closed shunt, the other in a normally-open shunt, including two separable parts of the shifting mechanism, and which is completed by the descending carbon-holder of the set of carbons first to be consumed, as and for the purpose set forth.

6. In an electric lamp, the combination of a pivoted lever, two sets of carbons, feed mechanism connected with the lever for controlling the carbons, a main magnet and a shunt-magnet for controlling the movement of the lever, a current-shifting mechanism operated or brought into operation by a given movement of the lever produced by an abnormal strength of the shunt-magnet, and a current-shunting device for cutting the lamp out of circuit, operated by a similar movement of the lever beyond the point at which the shifting mechanism is operated, as and for the purpose set forth.

7. In a double-carbon lamp, the combination of a main-circuit magnet, a shunt-circuit magnet having two coils, one constantly closed, the other in a circuit that is closed by the rod of the carbons first consumed, a pivoted lever and feed mechanism connected therewith, a current-shifting mechanism, and a current-shunting mechanism, both arranged to be operated or brought into operation by the movement of the lever toward the shunt-circuit magnet, the shifting mechanism in one position of the lever due to an abnormal strength of the said magnet, and the shunting device in a position nearer to the limit of movement, as and for the purpose specified.

8. In a double-carbon lamp, the combination, with the magnets, the frame or lever, the clamps or clutches connected therewith, and the carbons controlled by the clutches, of the lever P and catch $p$, the shifting floor N, the lever R, and spring $s$, connecting the same with lever P, constructed and arranged for operation in substantially the manner set forth.

9. In a double-carbon lamp, the combination, with the magnets, the frame or lever, the clamps or clutches connected therewith, and the carbons controlled by the clutches, of the shifting mechanism, and lever P, for operating the same, the shunting mechanism, and lever U, for operating the same, both of said levers being in the path of movement of the frame or lever of the feed mechanism, and arranged to be shifted by the frame at different points in its path, as and for the purpose specified.

In testimony whereof I have hereunto set my hand this 5th day of February, 1885.

EDWARD WESTON.

Witnesses:
RICHARD WM. BLOEMEKE,
FRANK R. DOERR.